(12) United States Patent
Pretlove et al.

(10) Patent No.: US 7,714,895 B2
(45) Date of Patent: May 11, 2010

(54) INTERACTIVE AND SHARED AUGMENTED REALITY SYSTEM AND METHOD HAVING LOCAL AND REMOTE ACCESS

(75) Inventors: John Pretlove, Sandvika (NO); Thomas Pettersen, Oslo (NO)

(73) Assignee: ABB Research Ltd., Zürich (CH)

( * ) Notice: Subject to any disclaimer, the term of this patent is extended or adjusted under 35 U.S.C. 154(b) by 1055 days.

(21) Appl. No.: 10/743,315

(22) Filed: Dec. 23, 2003

(65) Prior Publication Data

US 2004/0189675 A1 Sep. 30, 2004

(30) Foreign Application Priority Data

Dec. 30, 2002 (SE) .................................. 0203908

(51) Int. Cl.
*H04N 5/232* (2006.01)
*H04N 5/225* (2006.01)
(52) U.S. Cl. ...................... 348/211.2; 348/61; 348/115; 348/207.99; 348/222.1; 700/264
(58) Field of Classification Search .............. 348/211.8, 348/211.4, 211.99
See application file for complete search history.

(56) References Cited

U.S. PATENT DOCUMENTS

| | | | |
|---|---|---|---|
| 4,992,866 A | | 2/1991 | Morgan |
| 5,155,683 A | * | 10/1992 | Rahim .......................... 701/25 |
| 5,579,444 A | * | 11/1996 | Dalziel et al. ................ 700/259 |
| 5,682,332 A | | 10/1997 | Ellenby et al. |
| 5,706,195 A | * | 1/1998 | Corby et al. .................... 701/2 |
| 5,745,387 A | * | 4/1998 | Corby et al. .................... 703/1 |
| 5,815,411 A | * | 9/1998 | Ellenby et al. ............... 702/150 |
| 5,825,982 A | | 10/1998 | Wright et al. |
| 6,535,793 B2 | * | 3/2003 | Allard .......................... 700/259 |

(Continued)

FOREIGN PATENT DOCUMENTS

EP 0729275 A2 8/1996

(Continued)

OTHER PUBLICATIONS

Milgram et. al., Telerobotic Control Using Augmented Reality, Robot and Human Communication, 1995. Ro-Man'95 Tokyo, Proceedings., 4th IEEE International Workshop, Jul. 5-7, 1995, pp. 21-29.*

(Continued)

*Primary Examiner*—Ngoc-Yen T Vu
(74) *Attorney, Agent, or Firm*—Venable LLP; Eric J. Franklin (57) ABSTRACT

An augmented reality system including a camera movably located at a local site captures an image. A registering unit generates graphics and registers the generated graphics to the image from the camera to provide a composite augmented reality image. A display device located at a remote site, physically separated from the local site, displays a view including the composite augmented reality image. A communication link communicates information between the local and the remote site. A specifying unit specifies a position and an orientation in the remote site. The registering unit is adapted to register the generated graphical representation to the image in dependence of the specified position and orientation. The camera is arranged such that its position and orientation is dependent on the specified position and orientation.

30 Claims, 4 Drawing Sheets

U.S. PATENT DOCUMENTS

| | | | |
|---|---|---|---|
| 6,690,338 B1* | 2/2004 | Maguire, Jr. | 345/8 |
| 6,690,370 B2* | 2/2004 | Ellenby et al. | 345/419 |
| 6,941,248 B2* | 9/2005 | Friedrich et al. | 702/188 |
| 7,038,699 B2* | 5/2006 | Sato et al. | 345/633 |
| 7,209,801 B2* | 4/2007 | Anfindsen et al. | 700/245 |
| 7,236,854 B2* | 6/2007 | Pretlove et al. | 700/246 |
| 7,324,081 B2* | 1/2008 | Friedrich et al. | 345/156 |
| 7,353,081 B2* | 4/2008 | Skourup et al. | 700/245 |
| 7,353,082 B2* | 4/2008 | Pretlove et al. | 700/264 |
| 7,391,424 B2* | 6/2008 | Lonsing | 345/633 |
| 2002/0010734 A1* | 1/2002 | Ebersole et al. | 709/201 |
| 2002/0057279 A1 | 5/2002 | Jouppi | |
| 2002/0082498 A1* | 6/2002 | Wendt et al. | 600/411 |
| 2002/0097322 A1 | 7/2002 | Monroe et al. | |
| 2002/0191002 A1 | 12/2002 | Friedrich et al. | |
| 2003/0179308 A1* | 9/2003 | Zamorano et al. | 348/333.12 |

FOREIGN PATENT DOCUMENTS

| | | | |
|---|---|---|---|
| JP | 6134687 A | | 5/1994 |
| JP | 8257948 A | | 10/1996 |
| JP | 9505138 T | | 5/1997 |
| JP | 11-309269 A | * | 11/1999 |
| JP | 11309269 A | | 11/1999 |
| JP | 2002247602 A | | 8/2002 |

OTHER PUBLICATIONS

S. Oyama et al., Development of a Mobile Robot which Embodies a Remote Instructor, Proceedings of the 2000 IEEE/RSJ, 2000, pp. 1014-1019.

C. Stroker et al., Antarctic Undersea Exploration Using a Robotic Submarine with a Telepresence User Interface, Environmental Application of AI, IEEE Expert, Dec. 1995, pp. 14-30.

Daude et al., Mobile Approach Support System for Future Machine Tools, IEEE, 1997, pp. 24-30.

English translation of Notice of Rejection, dated Mar. 12, 2009, issued by the Japanese Patent Office in counterpart Japanese Application No. 2004-000708.

* cited by examiner

INTERACTIVE AND SHARED AUGMENTED REALITY SYSTEM AND METHOD HAVING LOCAL AND REMOTE ACCESS

FIELD OF THE INVENTION

The present invention relates to an augmented reality system comprising: a camera for capturing an image, the camera being movably located at a local site, a registering unit generating graphics and registering the generated graphics to the image from the camera, to provide a composite augmented reality image, a display device located at a remote site, physically separated from the local site, for displaying a view comprising the composite augmented reality image, and a communication link, for communication of information between the local and the remote site.

The present invention also relates to a method for remotely displaying an augmented reality view comprising graphical information overlaid an image captured at a local location.

The system and the method according to the invention is suitable for performing remote tasks and processes, where the operator is physically separated from the location where the tasks or processes are preformed. The invention is, for example, useful in connection with remote robot programming, remote maintenance, inspection as well as remote collaboration.

The present invention also relates to a use of a system according to the invention for remote programming of an industrial robot.

PRIOR ART

Augmented reality (AR) is a well-known method of overlaying real world representations with computer-generated information. Ideally, for vision based augmented reality, the user will not be able to recognize the difference between the real and the computer generated graphics, and thereby getting an improved perception of the real world environment. Today, augmented reality techniques are used in a number of applications. New areas, where augmented reality is used is for instance within media (weather reporting), medicine (visualization of internal organs), for collaborative environments (virtual meeting room), and in the process industry for maintenance and service tasks.

With traditional vision based augmented reality systems, computer generated information is added to a real, local scene. Visualizing a remote environment with overlaid computer generated graphics is hereinafter referred to as remote augmented reality. Remote augmented reality is useful for tasks, where an expert is located at a distance from where a physical task is to be executed, such as inspection in hazardous environments, and service and support tasks.

Collaboration between users in an augmented reality system has been addressed in the literature. This can be done by introducing images of several remote users as overlaid graphics in a real environment. In such a system, meeting participants can visualize each other by looking at images of the meeting members rendered in an augmented reality. Further, the remote users may communicate by means of virtual information presented in the same augmented reality environment. However, it is not possible for the remote users not get different views of the local scene, seen from different viewpoints.

From the U.S. Patent Application with publication number U.S. 2002-0010734 A1 it is known to link augmented reality images to a computer network. The document describes an internet worked reality system comprising one or more local stations, which may be AR or non-AR, but at least one of the local stations must be AR, and one or more remote stations, which may be AR or non-AR. The local and the remote stations are networked together. The remote stations can provide resources not available at the local AR station, such as data bases, high performance computing, and methods by which, a person at the remote station can interact with a person at the local AR station.

In one embodiment disclosed, a trainee is located at the local AR station, while an instructor, located at the remote station, monitors and controls the training. In a maintenance embodiment, the operator performs tasks at the local AR station, while information and assistance are located at the remote AR station. The local AR station comprises a head mounted display for use by a person at the local station, a camera arranged in a fixed relation to the head mounted display, a computer comprising software for generating graphical representations, a video mixer mixing the generated graphical representation with the image to achieve a composed augmented reality image.

The head mounted display is adapted for showing a view comprising the composed augmented reality image. The view shown on the head mounted display depends on the orientation and position of the head of the user in the local AR station. Information about the composed augmented reality is transferred to the remote station through a network connecting the local and the remote station. The remote station comprises a display device adapted for displaying the composed augmented reality transferred thereto. A person located in the remote station will be able to view exactly the same view as a person wearing the head mounted display in the local station.

U.S. Pat. No. 5,745,387 shows an augmented reality maintenance system for operating in a hazardous environment, comprising an environment modeler, which creates a computer model of the environment. An environment renderer creates a plurality of images, each corresponding to a viewing location and orientation. A remotely operated manipulator arm is attached at a fixed end to a stationary structure and is provided with a utility package, such as a video camera attached to a distal end of the manipulator arm. Actuators move the manipulator arm to desired locations within the environment. The position and orientation of the manipulator arm are determined by a unit adapted for sensing position and attitude. This information is passed to a manipulator arm renderer, which creates an image from a pre-stored model of the manipulator arm, viewed from several different viewpoints. A viewpoint for rendering a computed view of the environment is determined by the operator, either by inputting coordinates or by selecting from a pre-established list of viewpoint coordinates and provide it to the environment renderer, which generates an image corresponding to the shapes defined by the environment geometry when viewed from the selected viewpoint.

The resulting viewpoint, formed by combining the position and orientation of the distal end of the manipulator arm and the off-set displacements of the utility package, will allow an environment rendered to produce images corresponding to views of the environment as seen from the viewpoint of the utility package. Similarly, position and orientation of the distal end of the manipulator arm is provided to a manipulator arm renderer. The manipulator arm renderer generates an image of the manipulator arm as seen from the same viewpoint used by the environment renderer. A video mixer superimposes an image of the manipulator arm and the image of the environment and displays the superimposed images on a monitor, thereby allowing an operator to visualize a position of the manipulator arm relative to its environment.

However, none of above described systems enables a remote operator to see the local scene from different viewpoints.

The invention is particularly suitable in connection with remote control of an industrial robot. Generation of high quality robot programs, e.g. for painting, grinding, and polishing, requires skilled programmers with extended process experience. This is due to the nature of todays programming systems, where process specific knowledge is important in order to meet quality requirements. Building up and keeping this competence within the end customer's organization is both time consuming and expensive. Cost savings can be accomplished if experts are located remotely and thereby can support or perform robot programming to several clients.

OBJECTS AND SUMMARY OF THE INVENTION

The object of the present invention is to provide an improved augmented reality system, which allows a remote operator to perform remote tasks or processes in an augmented reality that is displayed to the operator in such a way that he experiences that he is actually on site.

According to one aspect of the invention, the object is achieved by the initially defined system, characterized in that the system further comprises a specifying unit, for specification of a position and an orientation in the remote site, the camera is arranged such that its position and orientation is dependent on the specified position and orientation, and the registering unit is adapted for registering the generated graphics to the image in dependence of the specified position and orientation. In this context, a local site refers to where the process or task is to be executed and a remote site refers to where the operator performs the process or task.

The system according to the invention allows a remote operator to determine which viewpoint to be displayed. The operator specifies a position and an orientation corresponding to the desired viewpoint and the position and orientation of the camera is adjusted based on the specified position and orientation and the graphics are registered to the image based on the specified position and orientation. The system according to the invention allows a remote operator to visualize the environment of a local site and overlaid computer generated graphics from different viewpoints and thus enables the remote operator to be virtually present at the local site. An advantage gained by the invention is that the remote operators may see the local scene from different angles and get an improved perception of the environment by means of overlaid virtual graphics. There is no need for an expert to travel to the local site for service and support.

According to an embodiment of the invention, said specifying unit comprises a tracking unit adapted for determining the position and orientation of a movable device located in the remote site, in relation to a fixed pre-specified remote coordinate system. Preferably, the movable device is attached to or carried by the operator and thus the position and orientation of the operator determine the view displayed. The tracking unit is either a separate unit or a part of the movable device. The tracking unit could be any known type of sensor or technique used for determining position and orientation. Preferably, said movable device is the display device. The display device is preferably a handheld display device or a head-mounted display device. Thus, the viewpoint displayed depends on the position and orientation of the display device. If the operator carries the display device, the actual movements of the operator control the position and orientation of the camera and accordingly the viewpoint displayed.

According to a preferred embodiment of the invention, the system further comprises a robot located at the local site, the camera is mounted on the robot and the robot is arranged in such a manner that a movement of the robot, in relation to a fixed pre-specified local coordinate system depends on the specified position and orientation. Preferably, the movements of the robot depend of the movements of the movable device. When the user wears the movable device, the robot is moved in accordance with the operator's movements. Whit a robot is meant an industrial robot. A robot comprises a manipulator and a control system controlling the movements of the manipulator.

According to a further embodiment of the invention, the system comprises a graphical generator, for generation of a graphical representation, and the registering unit is adapted for generating graphics based on the graphical representation. It is advantageous to firstly generate a graphical representation and then generate graphics based on the graphical representation, since the graphical representation can easily be transferred between the remote and the local site without any high demand on the bandwidth.

According to a further embodiment of the invention, the system comprises operator input means located at the remote site, provided for feeding data related to graphics to be displayed, to the system. By the provision of an operator input means for feeding data related to the graphics to be displayed, the operator is able to add virtual information to the virtual environment, e.g. annotations or graphical illustrations. In hazardous or unreachable environments, it may be necessary to introduce robots in order to perform inspection of certain properties in a process or device. This may be the case in environments with nuclear radiation, deep see locations, extreme temperature situations, etc. With a remote expert performing this inspection, the remote augmented system will be able to provide the remote operator with the required images of the object to be inspected. This embodiment of the invention provides the remote operator with possibility to add virtual information to the real environment, providing the operator with enhanced perception of the local scene. For instance, at remote robot programming, the virtual information may comprise the programmed robot path and process related information describing the robot processing result. For remote inspection, the virtual information may comprise a temperature or radiation map of the real environment, or status information of an object or structure.

According to a preferred embodiment of the invention, the system further comprises a pointing device and a tracking unit for determining the position of the pointing device and the system is adapted for generating a graphical representation of a point being presently pointed out by the pointing member based on the position of the pointing device. Preferably, the pointing device is handheld. Such a pointing device can for example be use by an operator at the remote site for teaching point a robot path. In a further embodiment, the system comprises two pointing devices and two tracking units, the second pointing device and second tracking unit is used by an operator located at the local site.

The pointing device is particularly useful in connection with teaching a robot program when there is no personnel with robot programming skills at the local site, where the processing is to be performed, or if there is no model of a target object to be processed. The pointing device allows a process expert, located remotely from where the robot is, to perform a certain task on an image of the actual target object. By using the pointing device, a remote operator can perform the robot programming task by teaching points in the virtual world and the points taught are shown by a graphical representation. The remote operator may wear a head-mounted display, showing a graphical representation of the real world as seen from the camera with overlaid computer generated graphics. The computer-generated graphics may, for example, represent the pointing device, process related information, and the programmed robot path. The pointing device is used to specify waypoints of the robot path and the operator input means is used to specify process related information to the system.

According to one embodiment of the invention, the system comprises a second specifying unit, for specifying a position and an orientation in the local site, a second registering unit for generation of graphics and for registering of the generated graphics to the real environment or to an image of the environment of the local site in dependence of the position and orientation specified by the second specifying unit, and a local display device adapted for displaying a view comprising the environment of the local site and the graphics projected on the environment. A second display device at the local site makes it possible for a local operator to supervise the remote operator's actions. This embodiment of the invention allows the remote operator and the local operator to simultaneously view the same environment with the same overlaid computer generated graphics from their own viewpoints. By sharing the same augmented environment, the local operator may support the remote operator. The viewpoint displayed to the remote operator depends on the position and orientation specified by him, e.g. the position of his hand or head, and the viewpoint of the local operator depends on the position and orientation specified by him.

According to one embodiment of the invention, the system comprises a second movable device located at the local site, and the second specifying unit comprises a second tracking unit, determining the position and orientation of the second movable device. In a preferred embodiment, said second movable device is the local display device. The local display device is, for example, a handheld display device or a head-mounted display. Thus, collaboration between a remote and a local operator is made possible by illustrating the actual movements of the operators in the real environment with computer generated graphics. System users will be able to interact through a shared virtual environment and both the remote and the local user are able to change viewpoints.

According to one embodiment of the invention, the system also comprises a second graphical generator, located at the local site, for generating a second graphical representation, and the local display device is adapted for displaying a view comprising the second graphical representation. Thus, it is possible for the local operator to generate a graphical representation and add graphics to the displayed view. The communication link is adapted for communication of the generated graphical representations between the local and the remote site. Thus, it is possible for both the local and the remote operator to modify the graphic, but still both operators view the same graphics but from different viewpoints. Since only the graphical representation and the video signals from the camera are transferred between the local and the remote site, instead of the graphics or the entire composite augmented reality image, the communication bandwidth is reduced.

According to one embodiment of the invention, the system comprises a second camera for capturing an image, the camera being arranged in a fixed relation to the second movable device, and a second registering unit, registering the generated graphical representation to the image from the second camera, to provide a composed augmented reality image and that the local display device is adapted for displaying a view comprising the composed augmented reality image. In this embodiment, the computer-generated graphics are merged with an image of the real world. Alternatively, the computer-generated graphics are displayed on see-through glasses worn by the operator. The generated graphics are projected on the glasses, so that the operator can see the graphics in relation to the real world and the object to be processed.

According to one embodiment of the invention, the remote display device is adapted for displaying a view seen from a first visual angle that depends on a position and an orientation specified at the remote site and the local display device is adapted for displaying the same view as the remote display device, seen from a second visual angle that depends on a position and orientation specified at the local site.

According to one embodiment of the invention, the system comprises means for transferring voices between the local and the remote site via the communication link. Thus, the remote operator and the local operator may communicate by talk to each other. Preferably, said communication means comprises microphones or headsets located at the remote and the local site. Preferably, the communication link is a network such as the Internet.

According to a further aspect of the invention, the object is achieved by the initially defined method, comprising specifying a position and an orientation in a remote site that is physically separated from the local site, positioning and orientating a camera, located at the local site, according to the specified position and orientation, obtaining said image from the camera, generating graphics, generating a composite augmented reality image based on the image, the graphics, and the specified position and orientation, and displaying a view comprising the composite augmented reality image.

According to another aspect of the invention, the object is achieved by a computer program directly loadable into the internal memory of a computer, comprising software code portions for performing the steps of the method according to the invention, when said product is run on a computer. The computer program product is provided either on a computer readable medium or through a network, such as the Internet.

According to still another aspect of the invention, the object is achieved by a computer-readable medium having a program recorded thereon, where the program is to make a computer perform the steps of the method according to the invention, when said program is run on the computer.

According to an embodiment of the invention the system comprises a handheld display device comprising the display member and a camera. Preferably the handheld display device is arranged so that the user seems to look directly through the display. A handheld display device is useful when a user needs to see the computer-generated information from time to time.

The invention allows tasks or processes, e.g. generation of robot programs, to be performed from remote locations. Advantages gained by the invention when used for remote robot programming is: no need for an end-customer to hire and train personnel with robot programming competence and the robot programming will become more efficient with a pool of programming experts in a collaborative environment.

BRIEF DESCRIPTION OF THE DRAWINGS

The invention will now be explained more closely by the description of different embodiments thereof and with reference to the appended figures.

DETAILED DESCRIPTION OF PREFERRED EMBODIMENTS OF THE INVENTION

Figure 1:
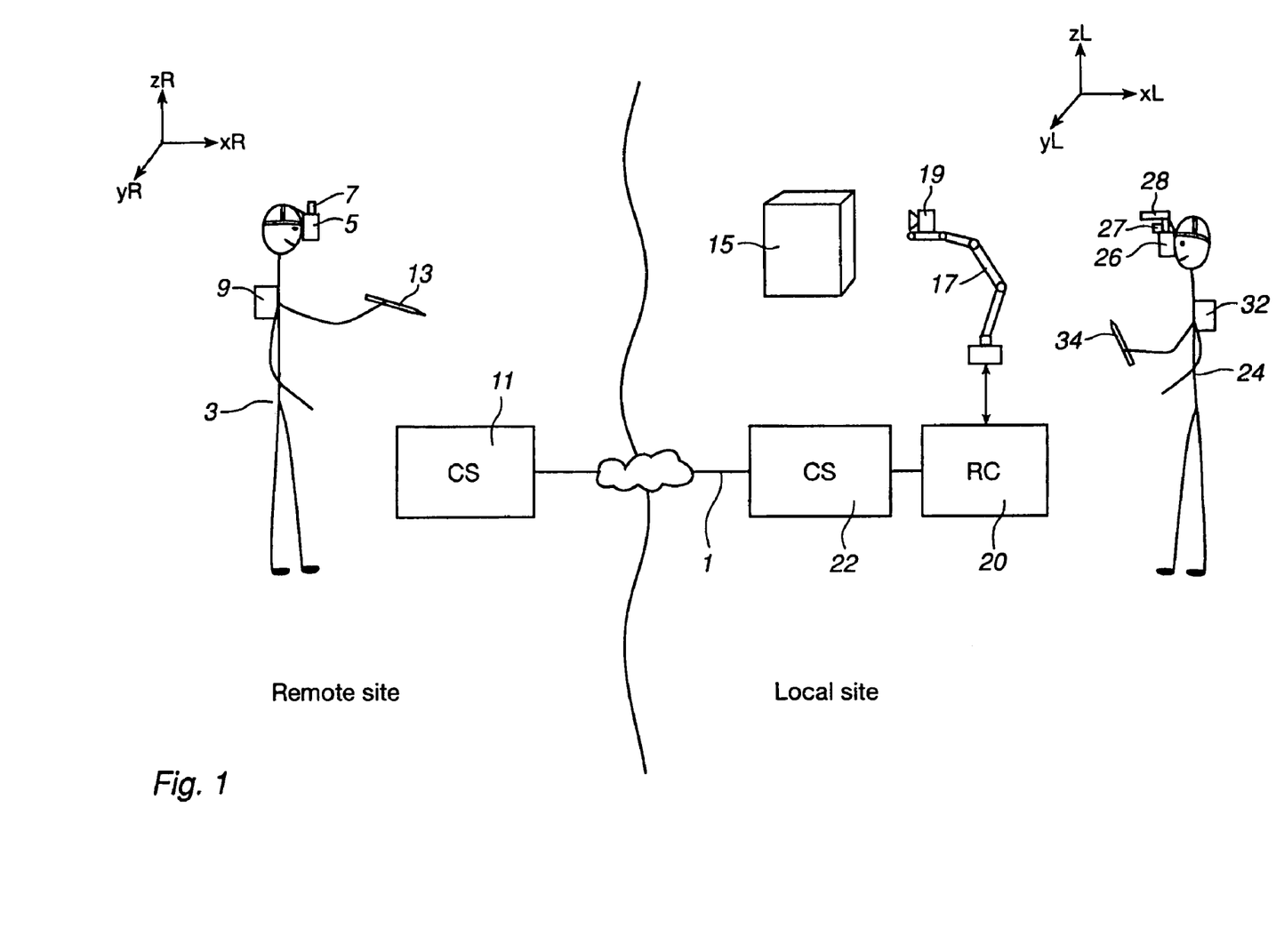
FIG. 1 shows an augmented reality system according to an embodiment of the invention.

FIG. 1 illustrates an augmented reality system according to an embodiment of the invention. The system comprises one section located at a remote site and one section located at a local site. The local and the remote sections are connected to each other via a communication link 1. One or more remote operators 3 are located at the remote site. The remote section comprises a graphical display device 5, e.g. a head-mounted display device, a tracking unit 7 for determining the position and orientation of the display device 5 in relation to a fixed remote coordinate system (xR, yR, zR), a computer 9 containing the necessary software in order to generate a graphical representation and an augmented reality image, and an communication unit 11 for communication with the local site and the computer 9. Preferably, the tracking unit 7 has a fixed position and orientation in relation to the display device 5. The computer 9 is for instance a wearable computer. Different types of handheld displays, such as a Personal Digital Assistant (PDA) screen could also be used.

The remote operator 3 also has a pointing device 13, which makes it possible for the operator to point out positions and orientations at the remote site. The pointing device 13 comprises a tracking unit for determining the position and orientation of the pointing device 13. Positions and orientations from the pointing device tracking unit and the display tracking unit will be related to a remote coordinate system (xR, yR, zR), corresponding to a local coordinate system (xL, yL, zL) at the local site. In one alternative, the pointing device comprises a number of interaction means, such as pushbuttons, which are adapted for interaction between the operator and the system. The interaction means are, for example, adapted for input of information related to the process to the system. Alternatively, the operator feds information to the system via a keyboard or any other known input means. The display tracking unit 7 and the pointing device tracking unit is based on any known technology for determining position and orientation, such as image recognition, accelerometers, inertial sensors, gyros, magnetic trackers, ultrasound, laser technology, and a global positioning system (GPS).

An object 15 to be processed or inspected is positioned at the local site. The local section of the system comprises one or a plurality of robot manipulators 17, and a camera unit 19 mounted at one end of a robot arm for capturing stereoscopic or monoscopic video streams of the object 15. A tracking unit may be provided for determining the position and orientation of the robot-mounted camera. Alternatively, a system for calculating the position and orientation of the camera based upon information from the robot control system is provided. A robot controller 20 is connected to the robot manipulator or each of them, making it possible to move the robot arm according to a specified position and orientation in relation to the fixed local coordinate frame (xL, yL, zL) in real time. In the following a position and an orientation is denoted a pose. The local section further comprises a communication unit 22 for communicating with the remote communication unit 11.

Before the system can be used for the desired purpose, fixed remote (xR, yR, zR) and local (xL, yL, zL) coordinate systems need to be specified. Poses from the remote site (7, 13) are in relation to the remote coordinate system, while poses specified at the local site are in relation to the local coordinate system. Thus, when the remote operator 3 specifies a pose in relation to the remote coordinate system, a definition of the local coordinate system defines the pose of this point in the local environment.

All types of cameras can be used, but the demand for accuracy of position and orientation determines the type of camera. For example, a web camera, a video camera, or a CCD camera could be used. In another embodiment, more than one camera can be used, for example two cameras could be used arranged so as to provide stereoscopic images. Any known industrial robot having sufficient number of degrees of freedom, preferable at least five degrees of freedom, could be used. An industrial robot comprises a manipulator having a number of arms movable relative to each other and a control system controlling the movements of the arms.

In one embodiment of the invention, the system is operated without a local operator present. In another embodiment of the invention, a local operator is present in order to support the remote operator. When a local operator 24 is present, the local section further comprises a graphical display device 26, e.g. a head-mounted display, a camera 28 mounted on the display device, for capturing a stream of images of the environment and the object 15, a tracking unit 27 for determining the position and orientation of the display device 26 and the camera 28 in relation to the local coordinate system, and a computer 32 containing the necessary software in order to generate a graphical representation and an augmented reality image based upon the video stream from the camera 28 and the generated graphical representation.

The camera 28 is mounted in a fixed position in relation to the display device 26. Preferably, the display device will be located along the camera view axis and at the image plan of the camera. In an alternative embodiment, the display device 26 is an optical see-through display and then, the camera is not needed, since the local operator 24 sees the real world environment and the object directly through the display device without the camera stream. The local section also comprises a hand-held pointing device 34 with a tracking unit for determining its position and orientation in relation to the local coordinate system and means for interacting with the system. Preferably, the computer 32 is a wearable computer.

The remote operator 3 wears the display device 5 and the movements of the operator are sensed by means of the tracking unit 7. The communication between the display unit 5 and the wearable computer 9 is done through a wired or wireless link. The computer 9 contains the necessary software in order to generate a graphical representation and an augmented reality image based upon the video stream from the camera 19 and the generated graphical representation. The computer 9 also contains the software needed to perform a desired task or process, e.g. generating a robot program. Finally, the computer 9 will contain a storage medium in order to save and restore previously saved information.

The communication of information from the pointing device 13 to the computer 9 is done through a wired or a wireless link. Depending of the type of tracking system, the pose of the pointing device 13 can come from the pointing device itself or from an external tracking unit. The communication unit 11 contains the necessary software and hardware to allow communication from the computer 9 to the local communication unit 22. Communication from the computer 9 to the communication unit 11 can be provided by means of a wired or a wireless communication link. Communication between the remote 11 and the local 22 communication units may be done through the Internet or some other appropriate communication link.

The camera 19 is mounted at a distal end of the robot 17 and transmits images of the environment and the object 15 to the remote operator 3. The robot controller 20 receives continuously updated poses from the remote display tracking unit 7, so that the camera is positioned according to the pose of the remote operator 3. The position of the pointing device 34 and the display device 26 is related to the local coordinate system. The local operator 24 wears the display device 26, which will provide the operator with an augmented reality view of the local environment and the object 15. If the display device 26 is of a video see-through type, the camera 28 is used for capturing images of the local environment. If the display device 26 is of an optical see-through type, the camera is not needed.

The local operator 24 uses the pointing device 34 to specify poses and interact in the shared virtual environment. The position of the pointing device 34 is tracked in relation to the local coordinate system. The computer 32 contains the necessary software to produce the local augmented reality view. The computer 32 generates the process or task related graphics as seen by the remote operator. The computer 32 also contains a graphics unit containing a graphical representation of the virtual world transferred from the remote section or other local sections via the communication link 1. Thus, it is not necessary to transfer the graphics in video format between the local and the remote site, thereby reducing the communication bandwidth requirements. The computer 32 further comprises a storage device used to save process related information, e.g. virtual graphical representations, or process or task related information provided by the remote or local operator. The local site may also contain more local operator interacting with the system in the same manner.

Figure 2:
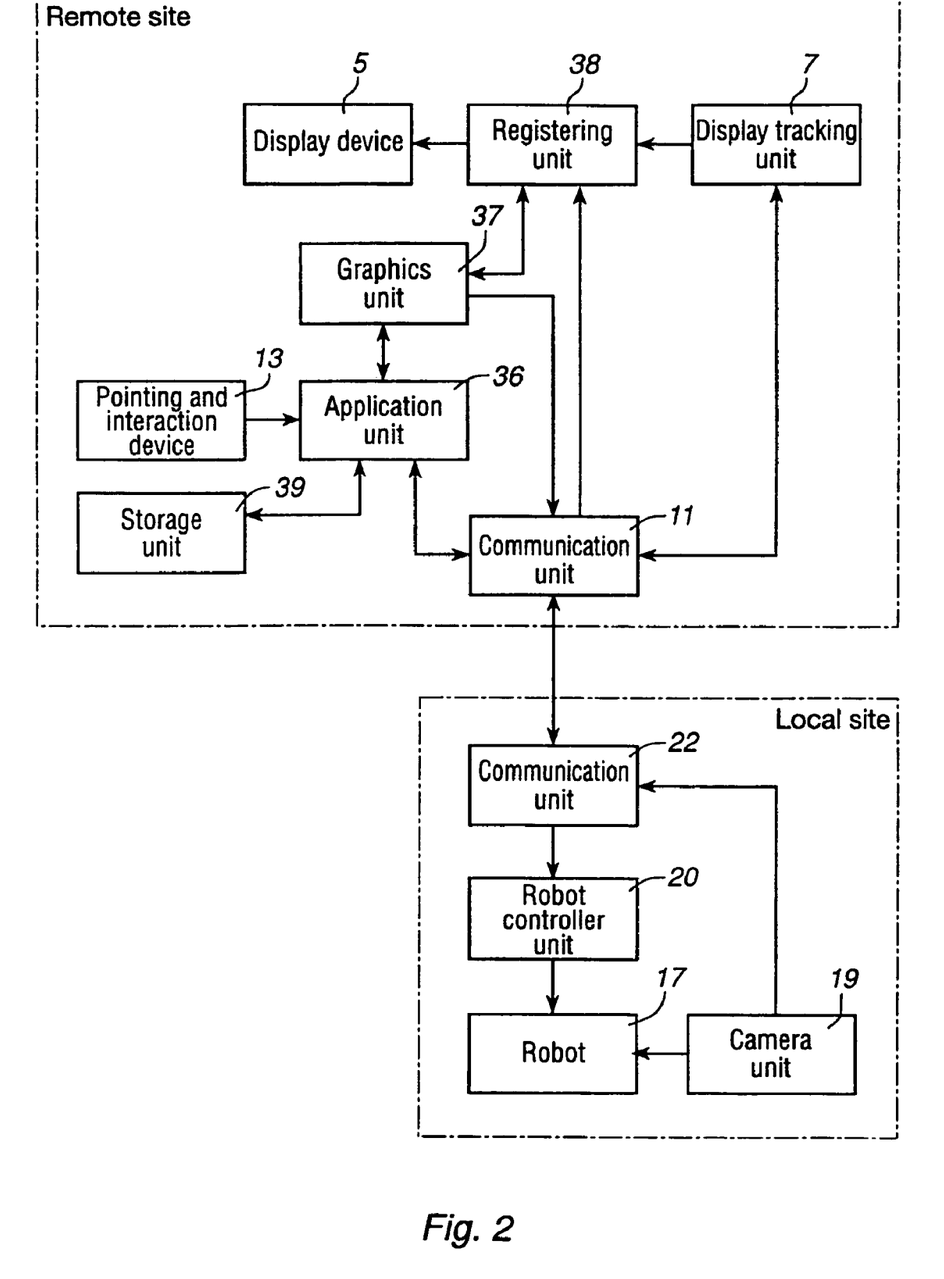
FIG. 2 is a block diagram of an augmented reality system according to an embodiment of the invention comprising a local section and a remote section.

FIG. 2 is a block diagram of an augmented reality system according to an embodiment of the invention. The remote section of the system, located at the remote site, receives a video stream of images from the robot-mounted local camera 19. The remote operator 3 is able to interact with the system through the pointing and interaction device 13. The tracking unit makes it possible to trace the pose of the pointing device in 3D, and can also be used for specifying the remote coordinate system. In the case of robot programming, the pointing device 13 can be used for specifying waypoints in a robot path and for specifying process related information, while for remote inspection, the pointing device may be used for adding virtual information to the object or structure to be inspected.

The output from the pointing device 13 and the information fed to the system by the operator are transferred to an application unit 36. The application unit 36 contains the necessary software to perform the desired process or task, e.g. generate a robot program or support remote inspections. A graphics unit 37 comprises a graphical generator for generating a 3D graphical representation of the visual information that is to be displayed from the application unit 36. The graphics unit 37 comprises specification of a number of 3D graphical elements to be visualized. In addition to holding the representation of the graphics from the application unit 36, the graphics unit 37 also contains the entire virtual graphical representation from other remote or local sections. The positions of all the graphical elements are specified in relation to the remote coordinate system. For the robot programming application, relevant visual information are operator specified waypoints, the actual robot path, and task specific information. Additionally, the pose of the pointing device will be rendered so that an operator may get visual indications of what other operators are pointing at. The generated graphical representation is transmitted to a registering unit 38. A storage unit 39 enables saving and loading of application related information.

The display-tracking unit 7 continuously delivers updated data regarding the pose of the display device 5. The pose data are transmitted to the communication unit 11 for further transmission to the robot controller unit 20. The pose data from the display-tracking unit 7 are also transmitted to the registering unit 38. The registering unit 38 generates the graphics and based on the graphical representation in the graphics unit 37 it registers the graphics to the image from the camera unit 19 to provide a composed augmented reality image. The registering unit 38 uses the pose data from the display-tracking unit 7 to overlay the computer generated graphics with the real world images. With the registration correctly done, the computer generated graphics will be virtually attached to the real world scene. The combined images are displayed on the display device 5.

The local communication unit 22 receives continuous information regarding the pose of the remote display device 5 in relation to the remote coordinate system and feeds this data to the robot controller unit 20 steering the robot-mounted camera 19 to the same pose in relation to the local coordinate system. The camera 19 continuously captures images of the scene, which are transmitted back to the communication unit 22 and further to the registering unit 38.

Figure 3:
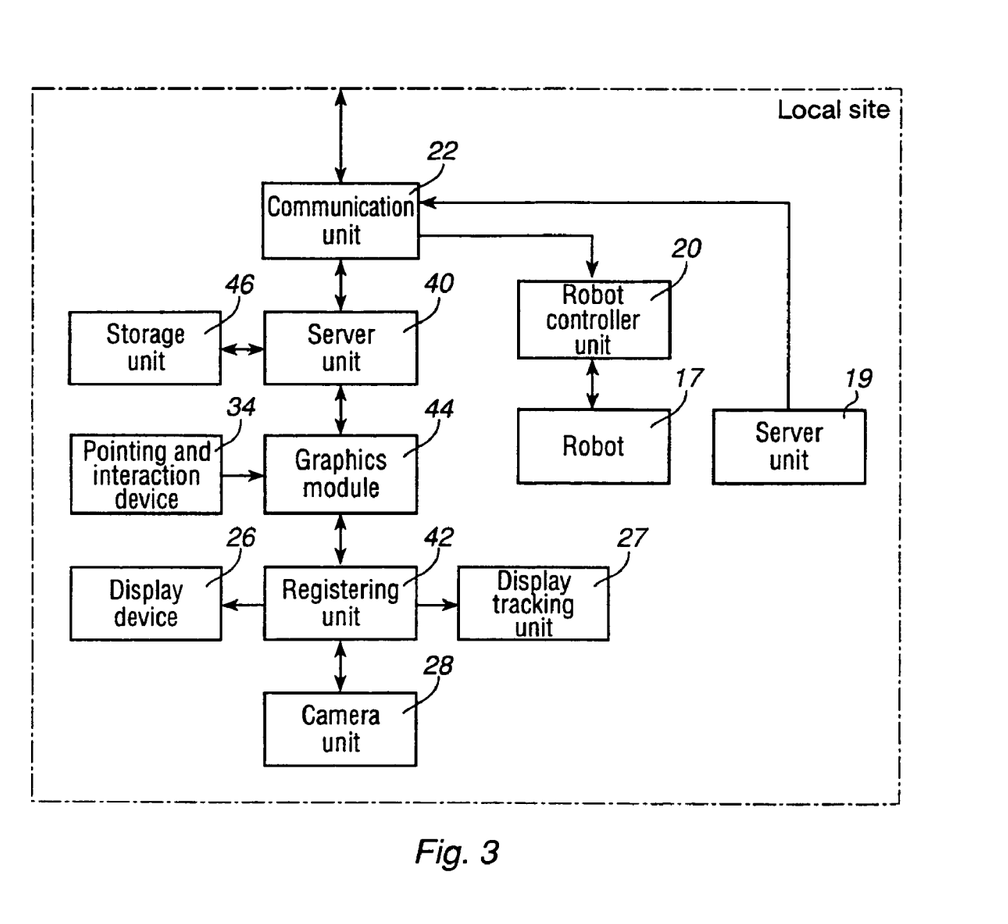
FIG. 3 is a block diagram of a local section of an augmented reality system according to another embodiment of the invention.

FIG. 3 shows another embodiment of the local section at the local site. This embodiment is provided for collaboration between a remote and a local operator. The communication unit 22 receives the current pose of the remote display device 5, the current pose of the remote pointing device 13, and process specific information specified by the remote operator, and the graphical representations generated in the remote graphics unit 37. The received graphical representations are transmitted to a local server unit 40. A camera unit 28, which is attached to the display device 26, produces local real world images. The pose of the camera 28 and the display device 26 are determined according to the local coordinate system and is transmitted to a registering unit 42 to overlay the real world scene with the computer generated graphics generated from a graphics module 44. The graphics module 44 receives information from the remote site regarding the virtual graphical information to be displayed, which is a representation of the graphical elements to be rendered in the shared virtual environment.

The local operator uses the pointing and interaction device 34 to interact with the system. The pose of the pointing device will be rendered with graphical information in such a way that it is visible through the shared virtual environment. Graphical representations related to the local operator are transmitted by means of the communication unit 22 to the other operators. Information from the pointing and interaction device 34 is transferred to the local graphics module 44 that generates a graphical representation of the pointing device. This graphical representation is transferred to the local registering unit 42, to the communication unit 22, via the server unit 40, and further to the remote graphics unit 37, via the remote communication unit 11. The remote graphics module adds the received graphical representation to the graphical representation generated based on the remote information. Thus, the remote and the local operator are able to see the same view seen from different viewpoints.

The server unit 40 receives data from the remote site through the communication unit 22. Further, the server unit 40 holds information regarding the local coordinate system. A storage unit 46, in communication with the server unit 40, is used to store the system information, e.g. application related information, graphical representations, and system configuration parameters, such as the local coordinate system. One or several local operators may be attached to the server unit 40.

The system is adapted for transmitting voices to/from the remote operator via the communication link to/from the local operator. By equipping both local and remote operators with microphones and headsets, it will be possible for the operators to communicate with each other by means of voice.

The following comprises a description of how the augmented reality system according to the invention could be used. Either the local or the remote operator can initiate a session. Alternatively, a session is scheduled in advance. At first, the local coordinate system needs to be specified. One way of doing this by a six point calibration method, where the operator specifies six points describing the position and orientation of the coordinate system.

All pose information provided by the local tracking units will be in relation to this local coordinate system. The position and orientation of the robot or robots in relation to this local coordinate system also needs to be known. This way, a remotely specified point can be mapped to the robot coordinate system.

A remote operator starts operating the system by wearing the display device. The remote operator then needs to specify the remote coordinate system, which will be corresponding with the local coordinate system. The remote coordinate system may be specified in the same manner as the local word coordinate system. All pose information provided by the remote tracking units will be in relation to this remote coordinate system. At the local site, a target object is positioned at a desired position in relation to the local coordinate system.

When the remote operator starts using the system, the movements of the remote display device will be captures by the display tracking unit and transmitted to the local application server by means of the communication link. The local communication server then sends a command to the robot controller to move the camera to the pose specified by the remote display-tracking unit. Now, the pose of the robot-mounted camera will move to the same pose related to the local coordinate system, as the tracking unit will be in relation to the remote coordinate system.

The pose of the remote pointing device is tracked in relation to the remote coordinate system. The pose information regarding the remote pointing device is transferred to the local communication unit. If a local operator is present, the position of the remote operator's pointing device will be used to render a computer generator graphics on the local display device of the local operator. Thus, the local operator will be able to visualize the movements of the remote operator's pointing device in real time by means of virtual 3D graphics overlaid the real scene.

The remote user may now perform the desired process, e.g. generate a robot program. During the execution of a specific task, process related information is visualized with computer generated 3D graphics on the remote display device. The graphics is overlaid the world representation from the local camera and is fixed with respect to the remote coordinate system. This makes it possible for the remote user to virtually move around the target object with a computer-generated graphics attached to the image of the target object. The movement of the remote operator will be captured and transmitted to the local robot-mounted camera in such a way that his camera moves according to the remote operator.

If the remote user performs some sort of off-line task, e.g. generating a robot path program, the local operator will also be able to visualize the process result in the same manner as the remote operator by means of 3D computer-generated graphics displayed on the local display device. The process graphics will be registered and overlaid the real world representation as seen from the local operator, hence when the local operator moves to a new position, the computer-generated process graphics will be visualized as fixed with respect to the local coordinate system.

If the local operator is also equipped with a pointing and interaction device, the position of the local pointing device is visualized to the local and the remote operator. The position of the local pointing device is tracked in relation to the local coordinate system. Pose information regarding the local pointing device is transferred to the remote site via the local and remote communication units. The pose information of the local operator's pointing device is used to render computer-generated graphics on the remote display device and the local display device. Thus, the remote operator will be able to visualize the movements of the pointing device of the local operator. If there are more remote operators, each remote operator will be able to visualize the movements of the pointing devices of the other remote operators The software used for implementing the method according to the invention is partly based on software known to those skilled in the art. For example, the positions and orientations of the pointing member may be generated in ARToolKit. The ARToolKit is developed by Washington University and the University of Hiroshima and is an open-source software library that enables augmented reality applications to be built using accurate computer vision-based tracking techniques. For the application interface, the software Open GL may be used. Open GL provides a library of 2D and 3D functions including modeling alterations, color, light and shade functions. Microsoft Vision SDK is a library for writing programs to perform image manipulation and analyses on computers. The augmented reality software includes algorithms for drawing graphics, such as points and lines, transferring positions and orientations between different coordinate systems, extracting and generating a sequence list of positions and orientations, capturing process related information, and drawing advanced graphics, such as color-coded points and lines representing paint strokes with different widths and orientations.

The present invention is not limited to the embodiments disclosed but may be varied and modified within the scope of the following claims. For example in an alternative embodiment, the remote site is provided with more than one camera, more than one display device, more than one specifying unit, more than one graphical generator, and more than one registering unit to enable two or more remote operators to simultaneously view the environment of the local site and the overlaid graphics from their own view. In another alternative embodiment, the local site is also provided with more than one camera, more than one display device, more than one specifying unit, more than one graphical generator, and more than one registering unit to enable two or more local operators to simultaneously view the environment of the local site and the overlaid graphics, from different view points.

In an alternative embodiment, the operator feeds the position and the orientation to the system. For instance the operator specifies the position and orientation by means of one or more joysticks. In this embodiment the display device is a stationary computer screen.

In one embodiment the system comprises a handheld augmented reality display device. The operator holds the handheld display device, showing the real world combined with overlaid computer-generated graphics. The computer-generated graphics may represent process related information, e.g. the programmed robot path, process specific information, target points and events. Either the operator's movements of his hand with a gesture-based recognition system or a pointing and interaction device is used to specify the process related information to the system.

The computer-generated information represents operator input for robot programming. The operator utilizes the handheld AR display to see the result of what he is doing while he is making a new robot program. The handheld display has a camera integrated with the same field of view as the display. The camera captures live video of the real world. The system combines and synchronizes the live video with computer-generated graphics representing the operator's input and presents it on the handheld AR display. The operator can freely move the handheld AR display in the environment, allowing the operator to see the local environment including the object from different viewpoints with overlaid computer generated graphics. The operator "looks" through the handheld AR display to see the generated robot program in relation to the real object.

Figure 4:
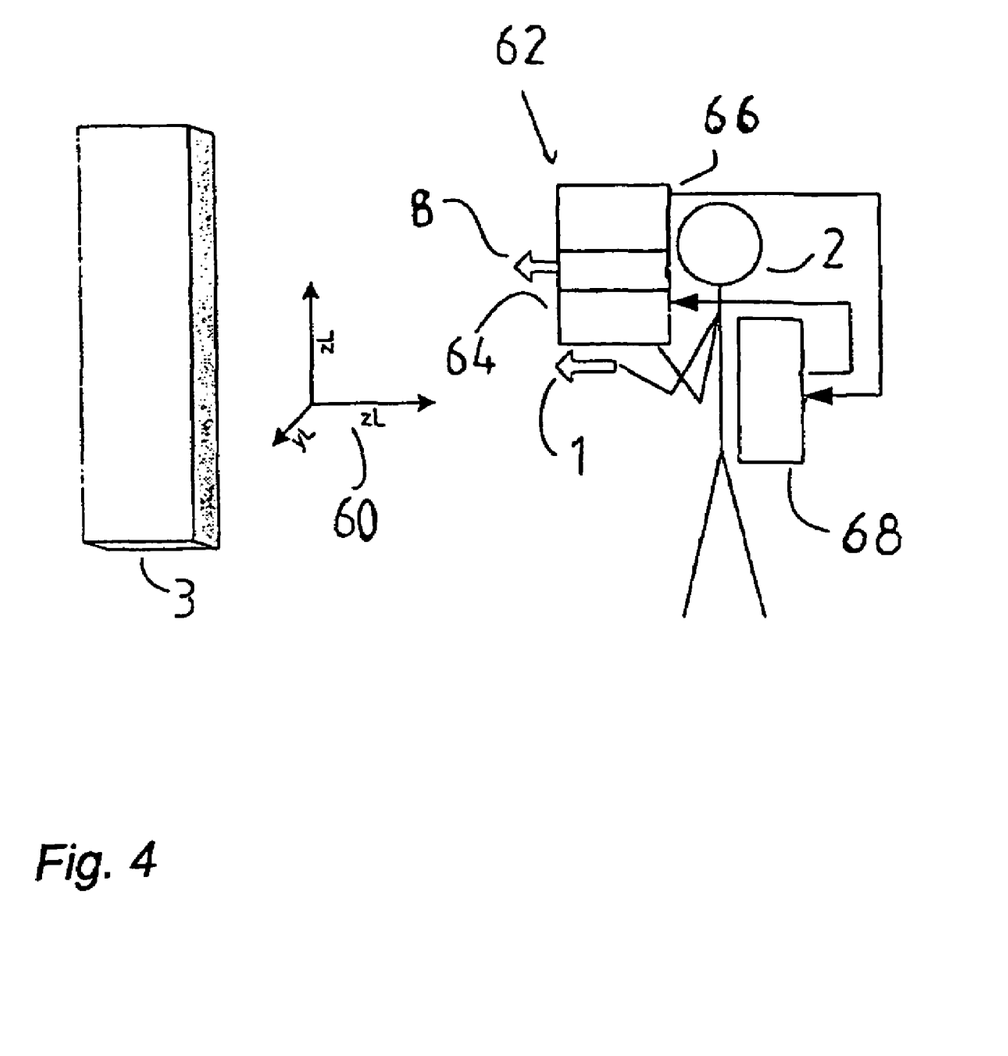
FIG. 4 shows an embodiment of the invention comprising a handheld display device

A system according to this embodiment is shown in FIG. 4. The system comprises a handheld interaction/pointing device 1 with a tracking system for determining its position and orientation in relation to a world coordinate system 60. Alternatively the system comprises a gesture-based recognition system comprising a recognition system for recognizing and determining the position and orientation of a hand or fingers in relation to the world coordinate system. The system further comprises a handheld display device 62, e.g. a tablet PC or a PDA (Personal Digital Assistant). The display device comprises a display member 64, a camera 8 for capturing a stream of images of the environment mounted on or integrated with the display device 64. The camera 8 will be mounted in a fixed position in relation to the display device 64. The display device will be located along the camera view axis and at the camera's image plane.

The system further comprises a tracking system 66 for determining the position and orientation of the display devices. The tracking system is preferable mounted on the display device. The system also comprises a system for generating an augmented reality representation of computer-generated graphical information overlaid the real world representation. The operator 2 movements are sensed through the display tracking system 66.

A wearable computer 68 contains the necessary software in order to generate the augmented reality environment based upon the video stream from the camera 8 and the computer-generated graphics. The wearable computer 68 also contains the necessary software needed to perform the desired task or process, e.g. generating a robot program and performing reachability check. Further, the wearable computer will generate the graphics, which will provide the augmented reality view. Finally, the wearable computer will contain a storage media in order to save, and restore previously saved, information. Communication of the information from the interaction/pointing device 1 to the wearable computer 68 is done through a wired or wireless link. The operator carries the display device 62 which will provide him/her with an augmented reality view of the environment. The display device is of "video see through" type.

Video see-through is used to generate and present an augmented reality world at the handheld AR display device. The camera integrated with the display device is used to capture a live video stream of the real world. The camera is located in relation with the display in such a way that it provides the same view, as the user would get by looking "through" the display device. The live video stream combined with computer-generated graphics is presented in real-time at the display device. Additional functionality includes camera zooming with output of the actual camera focal length. This will enable the system to display the computer-generated graphics correctly while zooming. The camera may also be used for vision-based tracking if vision-based tracking is used as the tracking system.

The invention claimed is:

1. A system for remote programming of an industrial robot, the system comprising:
   a camera for capturing an image, the camera being movably located on the robot at a local site,
   a first registering unit configured to generate graphics and register the graphics generated by the first registering unit on the image from the camera, to provide a composite augmented reality image comprising graphical information overlaid on an image captured at the local site,
   a remote display device carried by or arranged on an operator located at a remote site, physically separated from the local site, for displaying a view comprising the composite augmented reality image,
   a tracking unit associated with the remote display device and configured to determine a remote position and an orientation of the remote display device in the remote site in relation to a fixed remote coordinate system, wherein the first registering unit is adapted to register the generated graphics and image captured at the local site to the augmented reality image in dependence on the position and orientation specified by the tracking unit, and wherein the remote display device is adapted to display the generated graphics to the augmented reality image and image captured at the local site in dependence on the position and orientation specified by the first specifying unit,
   a specifying unit configured to specify a position and an orientation of the robot at the local site in relation to a local coordinate system, wherein a position and orientation of the robot is dependent on the remote position and orientation specified by the tracking unit in the remote coordinate system,
   a second registering unit configured to generate graphics and register the generated graphics on an environment at the local site or an image of the environment of the local site, in dependence on the position and the orientation specified by the specifying unit, to provide a composite augmented reality image comprising the generated graphics overlaid on the image of the environment at the local site, and
   a communication link configured to communicate information between the local site and the remote site, and to communicate to the robot positions and orientations specified by the tracking unit.

2. The system according to claim 1, wherein said tracking unit is adapted to determine a position and orientation of a movable device located at the remote site, the first registering unit adapted to register the generated graphics on the image in dependence of the position and orientation of the movable device, and the camera is arranged such that its position and orientation are dependent on the position and orientation of the movable device.

3. The system according to claim 2, wherein said movable device is the remote display device.

4. The system according to claim 1, further comprising
   a graphical generator configured to generate a graphical representation, wherein the first registering unit and the second registering unit are adapted to generate graphics based on the graphical representation.

5. The system according to claim 1, further comprising operator input device located at the remote site and configured to feed data related to the graphics to be displayed to the system, wherein the system is adapted to generate the graphics based on said data.

6. The system according to claim 5, wherein said operator input device comprises a pointing device and a tracking unit configured to determine a position of the pointing device and wherein the system is adapted to generate a graphical representation of a point pointed out by a pointing member based on the position of the pointing device.

7. The system according to claim 1, further comprising a second movable device located at the local site, wherein the specifying unit comprises a second tracking unit configured to determine the position and the orientation of the second movable device.

8. The system according to claim 7, wherein said second movable device is a local display device.

9. The system according claim 7, further comprising a second camera for capturing an image, the camera being arranged in a fix relation to the second movable device, wherein the second registering unit is adapted to register the generated graphics generated by the second registering unit to the image from the second camera, to provide a composite augmented reality image, and wherein a local display device is adapted to display a view comprising the composite augmented reality image.

10. The system according to claim 9, further comprising a handheld display device comprising a display member and the camera.

11. The system according to claim 10, wherein the handheld display device is arranged so that the user seems to look directly through the display.

12. The system according to claim 1, wherein the remote display device is adapted to display a view seen from a first visual angle that depends on the position and orientation received from the first specifying tracking unit and wherein a local display device is adapted to display the same view as the remote display device seen from a second visual angle that depends on the position and orientation received from the second specifying unit.

13. The system according to claim 1, wherein the communication link is configured to transfer voices between the remote and the local site.

14. The system according to claim 1, wherein the communication link comprises a network.

15. The system according to claim 1, wherein the system is configured for remote programming of an industrial robot by controlling movements of the robot at the local site and teaching the robot one or more waypoints to carry out a task.

16. The system according to claim 1, wherein the robot comprises elements for a paint application.

17. The system according to claim 1, further comprising:
a local display device configured to display the composite augmented reality image comprising the graphics generated by the second registering unit overlaid on the image of the environment at the local site.

18. A method for remote programming of an industrial robot arranged at a local site, the method comprising:
obtaining an image at the local site from a camera mounted on the robot,
generating first graphics,
registering the first graphics with the image at the local site,
generating a composite augmented reality image with a registering unit based on the image, the generated first graphics, and the specified position and orientation,
displaying the augmented reality image on a remote display device carried by or arranged on an operator at a remote site that is physically separated from the local site,
specifying a remote position and an orientation at the remote site with a tracking unit carried by or arranged on an operator at the remote site, wherein the position and orientation are in relation to a remote coordinate system,
specifying a local position and an orientation at the local site in relation to a local coordinate system based on the remote position and orientation specified at the remote site in the remote coordinate system,
positioning and orienting the robot in the specified local position and orientation such that a camera arranged on the robot assumes the specified local position and orientation,
displaying a view comprising an environment of the local site and the generated first graphics projected on the environment in dependence of the specified local position and orientation, and
remotely controlling movements of the robot at the local site and remotely teaching the robot one or more waypoints at the local site to carry out a task.

19. The method according to claim 18, wherein specifying a remote position and an orientation comprises determining a remote position and an orientation of a movable device located at the remote site and wherein the camera is positioned and oriented according to the remote position and orientation of the movable device.

20. The method according to claim 19, wherein said movable device comprises a remote display device and wherein said view comprising the composite augmented reality image is displayed on the remote display device.

21. The method according to claim 18, wherein the camera is mounted on the robot, the method further comprising controlling movements of the robot according to the remote position and orientation of a movable device.

22. The method according to claim 18, further comprising obtaining data related to the generated first graphics to be displayed, and
generating the first graphics based on said data.

23. The method according to claim 18, further comprising receiving information about the position of a pointing device and generating first graphics representing a point pointed out by a pointing member, based on the position of the pointing device.

24. The method according to claim 18, wherein specifying a local position and an orientation in the local site comprises determining a local position and an orientation of a second movable device located at the local site.

25. The method according to claim 24, wherein the second movable device comprises a local display device and wherein said view, comprising the environment of the local site and the graphics, is displayed on the local display device.

26. The method according to claim 25, further comprising capturing an image from a second camera being arranged in a fixed relation to the second movable device,
registering the generated graphics on the image from the second camera, to provide a composite augmented reality image, and
displaying a view comprising the composite augmented reality image on the local display device.

27. The method according to claim 18, further comprising generating second graphics, and displaying the view comprising the environment of the local site and the second graphics projected on the environment in dependence of the specified local position and orientation.

28. The method according to claim 27, further comprising
generating a local graphical representation,
generating a remote graphical representation,
transferring the local and remote graphical representations between the local and the remote site,
generating the remote first graphics based on the local and the remote graphical representation, and
generating the second graphics based on the local and the remote graphical representation.

29. The method according to claim 18, wherein the view displayed at the remote site comprises the environment of the local site and the overlaid graphics seen from a visual angle that depends on the remote position and orientation specified in the remote site and the view displayed in the local site comprises the environment of the local site and the overlaid graphics seen from a visual angle that depends on the local position and orientation specified in the local site.

30. A computer program product, comprising:
a computer readable medium; and
computer program instructions recorded on the computer readable medium and executable by a processor for performing a method for remote programming of an industrial robot by remotely displaying an augmented reality view comprising graphical information overlaid an image captured at a local site, the method comprising
obtaining an image at the local site from a camera mounted on the robot,
generating first graphics,
registering the first graphics with the image at the local site,
generating a composite augmented reality image with a registering unit based on the image, the generated first graphics, and the specified position and orientation,
displaying the augmented reality image on a remote display device carried by or arranged on an operator at a remote site that is physically separated from the local site,
specifying a remote position and an orientation at the remote site with a tracking unit carried by or arranged on an operator at the remote site, wherein the position and orientation are in relation to a remote coordinate system,
specifying a local position and an orientation at the local site in relation to a local coordinate system based on the remote position and orientation specified at the remote site in the remote coordinate system,
positioning and orienting the robot in the specified local position and orientation such that a camera arranged on the robot assumes the specified local position and orientation,
displaying a view comprising an environment of the local site and the generated first graphics projected on the environment in dependence of the specified local position and orientation, and
remotely controlling movements of the robot at the local site and remotely teaching the robot one or more waypoints at the local site to carry out a task.

* * * * *